United States Patent [19]

Erdmenger et al.

[11] 3,725,340
[45] Apr. 3, 1973

[54] PROCESS FOR THE PRODUCTION OF CROSSLINKABLE POWDER LACQUERS

[75] Inventors: Rudolf Erdmenger, Berg.-Gladbach; Martin Ullrich, Leverkusen-Schlebusch; Rolf Germedonk, Schildgen-Nittum; Josef Pedain, Cologne; Bernd Quiring; Frank Wingler, both of Leverkusen, all of Germany

[73] Assignee: Bayer Aktiengesellschaft

[22] Filed: Jan. 21, 1971

[21] Appl. No.: 108,389

[30] Foreign Application Priority Data

Jan. 27, 1970 Germany..................P 20 03 415.5

[52] U.S. Cl....260/47 EP, 260/75 NK, 260/77.5 AN, 260/77.5 AA, 260/80.3 R, 260/80.3 N, 260/86.7, 260/95 C, 264/176 R

[51] Int. Cl. .............................................C08g 30/14

[58] Field of Search..........264/144, 176 R; 260/80 C, 80.3, 260/95 C, 47 EP, 75, 67, 77.5, 78, 2, 18; 18/13

[56] References Cited

UNITED STATES PATENTS

| | | | |
|---|---|---|---|
| 3,546,326 | 12/1970 | Seifert | 264/176 |
| 3,480,591 | 11/1969 | Oertel et al. | 260/80 C |
| 3,451,103 | 6/1969 | Aykanian et al. | 264/176 R |

Primary Examiner—William H. Short
Assistant Examiner—T. Pertilla
Attorney—Connolly & Hutz

[57] ABSTRACT

Reacting lacquer resins containing hydroxyl groups with a softening point of from 50° to 150° C. and an alkoxymethyl isocyanate in the melt in a temperature-controlled screw extruder.

9 Claims, 2 Drawing Figures

PATENTED APR 3 1973
3,725,340
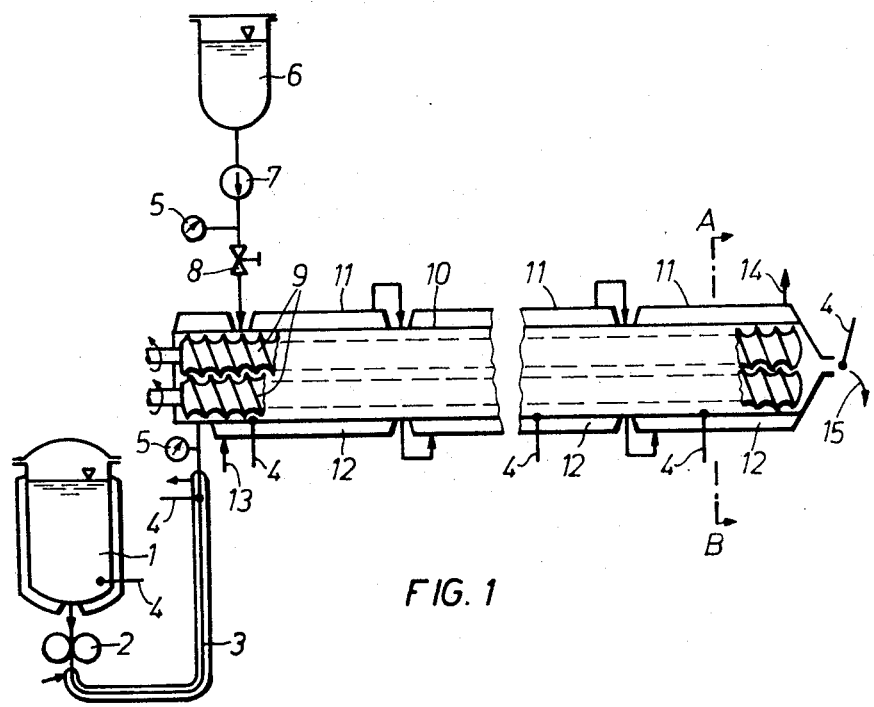
FIG. 1
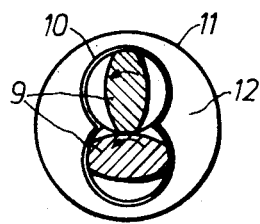
FIG. 2 A-B
INVENTORS:
RUDOLF ERDMENGER, MARTIN ULLRICH, ROLF GERMERDONK, JOSEF PEDAIN,
BERND QUIRING, FRANK WINGLER.
BY

PROCESS FOR THE PRODUCTION OF CROSSLINKABLE POWDER LACQUERS

This invention relates to a process for the solvent-free production of crosslinkable binders for electrostatic powder lacquering.

In this lacquering process, a pigmented, solvent-free lacquer binder or vehicle in the powder form, rather than a solvent-containing lacquer, is sprayed electrostatically on to the surface to be lacquered and then stoved as a result of which the solid powder particles soften and run to form an initially soft film which hardens through crosslinking of the binder. Since in this case the lacquer is processed in the absence of solvents and since in addition the binders are pigmented in the melt rather than in solution, it is also of advantage to prepare the binders in the absence of solvents.

Suitable crosslinkable binders for electrostatic powder lacquering are known and are described for example in U.S. Pat. No. 3,480,591. They are obtained by reacting lacquer resins containing hydroxyl groups with alkoxymethyl isocyanates. A few suitable hydroxyl-containing products can be prepared in substance in the absence of solvents, although subsequent reaction with alkoxymethyl isocyanates in a vessel equipped with a stirring mechanism can only be carried out at relatively low temperatures on account of the high reactivity of the alkoxymethyl groups and hence, to reduce viscosity and to keep the mixture stirrable, only by the addition of a solvent. The reaction in substance of for example a polyester melt with methoxymethyl isocyanate in a vessel equipped with a stirring mechanism can only be carried out with relatively small laboratory-sized batches (approximately 1 kg). It is not possible to react larger mixtures in substance because in this case the product is prematurely crosslinked. In batch operations on a commercial scale, therefore, the suitable crosslinkable lacquer binders can only be prepared in solution. Accordingly, the solvent has to be removed from the binder before the lacquer is prepared for use by the consumer, which is extremely difficult on account of the sensitivity of the products towards heat (crosslinking should not occur at this stage).

It has now been found that crosslinkable lacquer resins suitable for use as binders for powder lacquers can be obtained without any of the disadvantages referred to above by continuously reacting melts of lacquer resins containing hydroxyl groups with alkoxymethyl isocyanates in temperature-controlled screw extruders.

Accordingly, the present invention relates to the improvement of the process for the solvent-free production of crosslinkable lacquer resins suitable for use as binders for powder lacquers by reacting lacquer resins containing hydroxyl groups with a softening point of from 50° to 180°C, with alkoxymethyl isocyanates consisting in carrying out the reaction in the melt in temperature-controlled screw extruders.

The lacquer resins containing hydroxyl groups suitable for use in the process according to the invention have a softening point of from 50° to 180°C and preferably of from 60° to 120°C.

Reaction of the molten lacquer resins containing hydroxyl groups with alkoxymethyl isocyanates is carried out continuously in the absence of solvents. For this purpose, the lacquer resin is introduced in measured quantities into the screw extruder either in the form of a viscous melt by means of a gear pump or in the solid granular form in which case it is melted in a separate fusion zone. The reactant, a thinly liquid alkoxy methyl isocyanate, is added under pressure to the resin melt in the reaction zone of the screw extruder. The pressure prevailing in the reaction zone should be greater than the vapor pressure of the alkoxymethyl isocyanate at the maximum reaction temperature occurring so that a uniform liquid phase is guaranteed in that zone.

The reaction is then completed in a matter of minutes providing the residence times are narrowly distributed and the temperature accurately controlled. The reaction temperature is monitored through thermocouples let into the screw housing over which the product flows. The temperature is controlled through the screw housing which can be tempered in zones either electrically or by means of heat carriers, preferably by heating with a liquid heat carrier flowing in parallel current with the reaction melt. In general, the reaction according to the invention is carried out at temperatures from 10° to 70°C above the melting point of the lacquer resin containing hydroxyl groups.

The feed effect of the screw machine should be adapted through the rotational speed of the screw to the feed quantities discharged by metering units for the reaction components because otherwise the residence time spectrum is widened and hence the quality of the product adversely affected either through partial filling of the screw or through a pressure flow superimposed upon the screw feed.

In cases where the process according to the invention is carried out continuously, a force-feed self-cleaning twin-shaft screw extruder with screw shafts rotating in the same direction is preferably used in order to guarantee a narrow residence time spectrum.

FIG. 1 is a side elevation of a screw extruder of this kind, while

FIG. 2 is a cross section on the line A-B through the same machine.

In the Figures:

1 is the heated supply vessel for the lacquer resin melt to be reacted;
2 is the heated gear pump for dispensing the lacquer resin melt;
3 is the temperature-controlled pipe;
4 is the zone in which the temperature of the product is measured;
5. is the zone in which the pressure of the product is measured;
6 is the supply vessel for alkoxy methyl isocyanates;
7 is the piston-type metering pump;
8 is the pressure-retaining valve;
9 are the screw shafts;
10 is the screw housing;
11 is the heating jacket;
12 is the space for the heat carrier;
13 is the inlet for the liquid heat carrier;
14 is the outlet for the liquid heat carrier; and
15 is the outlet for the reacted melt from the screw machine.

The reaction zone of the screw extruder can be followed by a separate evaporation zone in which volatile constituents, for example residual unreacted alkoxymethyl isocyanates, are removed from the melt through an open screw housing, optionally under reduced pressure.

The reaction product leaves the screw machine in the form of a viscous melt which must be quickly cooled in order to prevent premature crosslinking. This is done for example in a cooling bath by blowing with cold air or under water, optionally in conjunction with a granulator. In this case, cooling can also be obtained by spraying the melt into cold air.

Undesired premature crosslinking of the reaction product is avoided by virtue of the brief residence time of the reagents in the heated screw housing of at the most 10 minutes.

The solidified products can readily be ground and pigmented without any difficulties, for example by melting and kneading with pigments in an extruder.

The products reacted in the process according to the invention are known. $C_1$–$C_8$ alkoxymethyl isocyanates such as for example methoxymethyl isocyanate, ethoxymethyl isocyanate, hexyloxymethyl isocyanate and octyloxymethyl isocyanate are used as the alkoxymethyl isocyanates. Methoxymethyl isocyanate is preferably used.

In the present context, hydroxyl-containing lacquer resins used as the reagent for the alkoxy methyl isocyanates, include in particular polyesters, polyacrylates and polyepoxides with a hydroxyl number of from 30 to 350 and a softening point of from 50° to 180°C and preferably from 60° to 120°C. The chemical composition and preparation of lacquer resins such as these is described in U.S. Pat. No. 3,480,591. Preferred polyester resins containing hydroxyl groups include the reaction products of polyvalent carboxylic acids such as phthalic acid, isophthalic acid or terephthalic acid with an excess of a polyhydric alcohol such as for example ethylene glycol, diethylene glycol, 2,2-dimethyl-1,3-propane diol, 1,3-butane diol, bis-hydroxy ethyl hydroquinone, 1,2-propane diol, 1,3-propane diol, 1,4-butane diol, 1,6-hexane diol, 4,4'-bishydroxy cyclohexyl-2,2'-propane, trimethylol propane or glycerol etc. Preferred polyacrylates containing hydroxyl groups include for example copolymers of acrylic acid, methacrylic acid, alkyl esters, acrylic acid or methacrylic acid hydroxy alkyl esters, acrylic acid or methacrylic acid amide, styrene and similar unsaturated compounds. Preferred epoxide resins include in particular the reaction products of bisphenol A with epichlorhydrin.

The quantity in which the alkoxymethyl isocyanate is used is governed by the hydroxyl content of the lacquer resin and also by the molecular weight of the alkoxymethyl isocyanate. In carrying out the reaction, it is only necessary to react some or also substantially all the hydroxyl groups. The alkoxymethyl isocyanate is best added in a quantity of from 0.1 to 50 percent and preferably in a quantity of from 2 to 30 percent, based on the quantity of the reaction product.

To accelerate the reaction, in other words to obtain the shortest possible residence time in the screw machine, a catalyst with an accelerating effect upon the reaction of the hydroxyl groups with isocyanate groups may be added to the lacquer resin before the reaction. Suitable catalysts include those known from polyurethane chemistry such as for example tertiary amines or organic compounds of tin which are preferably used in a quantity of from 0.01 to 0.5 percent, based on the lacquer resin.

The process according to the invention is illustrated by the following Examples:

EXAMPLE 1

A polyester resin prepared from 5 mols of phthalic acid, 2 mols of trimethylol propane, 3 mols of 2,2-dimethyl-1,3-propane diol and 1 mol of 1,2-propane diol, with a hydroxyl number of 120, an acid number of 2.0 and a softening point of around 105°C is run off in the form of a viscous melt from a heated supply vessel by means of a gear pump at a temperature of 140°C. The resin is delivered under pressure through a temperature-controlled tube as a result of which it is cooled to 110°C, and introduced in the form of a stream at a rate of 16.7 kg/hour into a twin-shaft screw extruder 2 meters in length with an external screw diameter of 32 mm, a product capacity of 0.8 liters and screw shafts rotating in the same direction at 52 r.p.m. (cf. FIGS. 1 and 2). In addition, 9 percent by weight (based on the quantity of polyester) of methoxymethyl isocyanate is introduced under a pressure of 8 atms. by means of a piston-type metering pump just after the polyester melt enters the screw extruder. A pressure of 2.2 atms. prevails in the screw extruder. The machine is heated by a thermostat with oil heated to 113°C in parallel current with the melt, the oil being cooled to 95°C. The temperatures prevailing inside the screw extruder, at 0.5 meter intervals, are, as measured in the direction of the product flow, 116°C 112°C, 107°C, 103°C and at the outlet end of the extruder 105°C. The reacted melt issuing from the extruder is cooled and ground.

The reaction in the screw gives a spontaneously crosslinking polyester resin which after grinding is pigmented by admixture with titanium dioxide in a ratio of 1:1 in a mixer and then re-fused in a kneading screw over a period of 20 seconds. The cooled material is broken up, ground and sifted. That componet of the powder with a grain size of less than 80 $\mu$ is separated off. The powder is free-flowing and even after prolonged storage does not form any agglomerates. It is sprayed in the conventional manner on to plates which are stoved for 30 minutes at 160°C. Extremely hard, glossy films with a thickness of 120 $\mu$ are obtained.

EXAMPLE 2

As described in Example 1, a polyester resin prepared from 3 mols of phthalic acid, 0.3 mol of 1,6-hexane diol, 2 mols of trimethylol propane and 1.7 mols of 1,2-propane diol, with a hydroxyl number of 180, and acid number of 2.1 and a softening point of 75°C, is introduced at 102°C into the screw extruder described in Example 1 at a rate of 15 kg/hour. The screws rotate at 42 r.p.m. Methoxymethyl isocyanate is then added in a quantity of 12 percent by weight (based on the quantity of polyester) as described in Example 1. The heating oil enters the screw jacket with a temperature of 111°C and leaves it with a temperature of 95°C.

The temperatures prevailing inside the screw extruder are 190°C, 112°C, 108°C, 106°C and, at the outlet end of the machine, 112°C. The reacted melt issuing from the extruder is cooled, ground and further processed as described in Example 1.

EXAMPLE 3

As described in Example 1, a polyester resin prepared from 3 mols of phthalic acid, 0.3 mol of 1,6-hexane diol, 2 mols of trimethylol propane and 1.7 mol of 1,2-propane diol, with a hydroxyl number of 180, and acid number of 2.1 and a softening point of 75°C, is introduced at 96°C into the screw extruder described in Example 1 at a rate of 14 kg/hour. The screws rotate at 50 r.p.m.. Methoxymethyl isocyanate is added in a quantity of 4.5 percent by weight (based on the quantity of polyester) as described in Example 1. The heating oil enters the screw jacket with a temperature of 133°C and leaves it with a temperature of 112°C.

The temperatures prevailing inside the screw extruder are 126°C, 131°C, 128°C, 124°C and, at the outlet end of the machine, 127°C. The reacted melt issuing from the extruder is cooled, ground and further processed as described in Example 1.

EXAMPLE 4

As described in Example 1, a polyester prepared from 5 mols of terephthalic acid, 2 mols of ethane diol, 2 mols of trimethylol propane and 2 mols of 4,4'-bishydroxy cyclohexyl-2,2-propane and a hydroxyl number of 146 and an acid number of 3.6, is delivered at 109°C into the screw extruder described in Example 1 at a rate of 11.5 kg/hour. The screws rotate at 52 r.p.m.. Methoxymethyl isocyanate is added in a quantity of 12 percent by weight (based on the quantity of polyester) as described in Example 1. The heating oil enters the screw jacket with a temperature of 133°C and leaves it with a temperature of 118°C. The temperatures prevailing inside the extruder are 125°C, 136°C, 126°C, 121°C and at the outlet end of the extruder 120°C. The reacted melt issuing from the machine is cooled, ground and further processed as in Example 1.

EXAMPLE 5

As described in Example 1, a polyester prepared from 1 mol of terephthalic acid, 1 mol of 1,2-propane diol, 3 mols of 2,2-dimethyl-1,3-propane diol, 2 mols of trimethylol propane and 4 mols of phthalic acid, with a hydroxyl number of 124, and acid number of 1.1 and a softening point of 96°C, is delivered at 108°C into the screw extruder described in Example 1 at a rate of 14.5 kg/hour. The screws rotate at 52 r.p.m.. Methoxymethyl isocyanate is added in a quantity of 7 percent by weight, (based on the quantity of polyester) as described in Example 1. The heating oil enters the screw jacket with a temperature of 133°C and leaves it with a temperature of 118°C. The temperatures prevailing inside the extruder are 126°C, 127°C, 124°C, 121°C and at the outlet end of the machine 115°C. The reacted melt issuing from the machine is cooled, ground and further processed as described in Example 1.

EXAMPLE 6

As described in Example 1, a polyacrylate prepared from 50 percent by weight of styrene, 20 percent by weight of hydroxypropyl methacrylate and 30 percent by weight of butyl acrylate, with an average molecular weight of 1500, a softening point of 85°C and a hydroxyl number of 76, is delivered at 106°C into the screw extruder described in Example 1 at a rate of 11 kg/hour. The screws rotate at 60 r.p.m.. Methoxymethyl isocyanate is added in a quantity of 8.5 percent by weight (based on the quantity of polyacrylate) as described in Example 1. The heating oil enters the screw jacket with a temperature of 125°C and leaves it with a temperature of 111°C. The temperatures prevailing inside the extruder are 119°C, 123°C, 118°C, 114°C and at the outlet end of the extruder 112°C. The reacted melt issuing from the extruder is cooled, ground and further processed, as described in Example 1.

EXAMPLE 7

As described in Example 6, a polyacrylate prepared from 40 percent by weight of styrene, 20 percent by weight of hydroxypropyl methacrylate and 40 percent by weight of ethyl acrylate, with an average molecular weight of 1500, a softening point of 80°C and a hydroxyl number of 76 is continuously reacted in the absence of solvents with from 8 to 10 percent by weight of methoxymethyl isocyanate in the screw extruder described in Example 1.

EXAMPLE 8

As described in Example 6, a polyacrylate prepared from 40 percent by weight of styrene, 15 percent by weight of acrylamide, 10 percent by weight of hydroxypropyl acrylate and 35 percent by weight of butyl acrylate, with an average molecular weight of 2000, a softening point of 90°C and a hydroxyl number of 37, is continuously reacted in the absence of solvents with from 8 to 10 percent by weight of methoxymethyl isocyanate (based on the quantity of polyacrylate) in the screw extruder described in Example 1.

EXAMPLE 9

An epoxide resin based on 2,2-bis-[p-hydroxyphenyl] propane and epichlorhydrin with secondary hydroxyl groups and terminal epoxide groups with an average molecular weight of 2000, and OH content of around 5 percent by weight and a softening point of around 85°C, is delivered in the solid granular form at a rate of 7 kg/hour into a twin-shaft 1-meter long screw extruder with an external screw diameter of 32 mm, a product capacity of 0.4 liters and screw shafts rotating in the same direction at 64 r.p.m. The screw housing is tempered by an oil thermostat to 132°C. The epoxide resin is initially continuously fused in the screw machine after which methoxymethyl isocyanate is added to the melt in a quantity of 5 percent by weight (based on the quantity of epoxide resin) by means of a piston-type metering pump. The reacted melt issuing from the extruder is cooled, ground and further processed described in Example 1.

EXAMPLE 10

An epoxide resin based on 2,2-bis[p-hydroxyphenyl]-propane and epichlorhydrin with secondary hydroxyl groups and terminal epoxide groups which has an average molecular weight of 2000, an OH content of approximately 5 percent by weight and a softening point of approximately 85°C, is delivered in the solid granular form at a rate of 10 kg/hour into a twin-shaft 1-meter long screw extruder with an external screw diameter of 32 mm, a product capacity of 0.4 liters and screw shafts rotating in the same direction at 80 r.p.m. The screw housing is tempered by an oil thermostat to 132°C. The epoxide resin is initially continuously used in the screw extruder, after which methoxymethyl isocyanate is added to the melt in a quantity of 3 percent by weight, (based on the quantity of epoxide resin) by means of a pistontype metering pump. The reacted melt issuing from the extruder is cooled, ground and further processed as described in Example 1.

EXAMPLE 11

An epoxide resin based on 2,2-bis-[p-hydroxyphenyl]-propane and epichlorhydrin with secondary hydroxyl groups and terminal epoxide groups which has an average molecular weight of 2000, an OH content of approximately 5 percent by weight and a softening point of approximately 85°C is delivered in the solid granular form at a rate of 20 kg/hour into a twin-shaft 1-meter long screw extruder with an external screw diameter of 32 mm, a product capacity of 0.4 liters and screw shafts rotating in the same direction at 96 r.p.m. The screw housing is tempered by an oil thermostat to 132°C. The epoxide resin is initially continuously fused in the screw extruder, after which methoxymethyl isocyanate is added to the melt in a quantity of 1.5 percent by weight, (based on the quantity of epoxide resin) by means of a piston-type metering pump. The reacted melt which issues from the extruder is cooled, ground and further processed as described in Example 1.

EXAMPLE 12

As described in Example 1, a polyester resin prepared from 4 mols of phthalic acid anhydride, 1 mol of terephthalic acid dimethyl ester, 2 mols of trimethylol propane, 3 mols of 2,2-dimethyl-1,2-propane diol and 1 mol of 1,2-propane diol, with a hydroxyl number of 124, acid number of 1.1 and a softening point of 97°C is delivered at 116°C into the screw extruder described in Example 1 at a rate of 23 kg/hour following the addition of 0.05 percent of tin dioctoate to accelerate the reaction. The screws rotate at 80 r.p.m. Methoxymethyl isocyanate is added in a quantity of 9 percent by weight, (based on the quantity of polyester) as described in Example 1. The heating oil enters the screw jacket with a temperature of 133°C and leaves it with a temperature of 120°C. The temperature prevailing inside the extruder are 133°, 133°, 125°C and at the outlet end of the extruder 130°C. The reactive melt issuing from the extruder is cooled, ground and further processed as in Example 1.

In the absence of the catalytic acceleration 1 the reaction referred to above, only 14.5 kg/hour of the same polyester resin can be similarly reacted with methoxymethyl isocyanate in the same screw machine.

We claim:

1. A solvent-free process for producing crosslinkable lacquer resins suitable for use as binders for powder lacquers which comprises feeding a lacquer resin containing hydroxyl groups with a softening point of from 50° to 150°C. and an alkoxymethyl isocyanate into a heated screw extruder, maintaining the reaction temperature within said screw extruder at from 10° to 70°C. above the melting point of said lacquer resin containing hydroxyl groups and controlling the feed rate and screw extruder rotational speed to obtain product removal at a rate commensurate with said feed rate and a maximum residence time for said reactants in said heated screw extruder of 10 minutes.

2. The process as claimed in claim 1, wherein methoxymethyl isocyanate is used as the alkoxymethyl isocyanate.

3. The process as claimed in claim 1, wherein a polyester containing hydroxyl groups is used as the lacquer resin.

4. The process as claimed in claim 1 wherein a polyepoxide resin containing hydroxyl groups is used as the lacquer resin.

5. The process as claimed in claim 1, wherein a polyacrylate resin containing hydroxyl groups is used as the lacquer resin.

6. The process as claimed in claim 1, wherein the reaction is carried out in the presence of a catalyst which accelerates the reaction between isocyanates and hydroxyl groups.

7. The process as claimed in claim 1, wherein the reaction is carried out in a self-cleaning twin-shaft screw extruder with screw shafts rotating in the same direction.

8. The process as claimed in claim 1 wherein the lacquer resin is introduced into the screw extruder in the solid form and fused in a separate melting zone.

9. The process as claimed in claim 1, wherein volatile constituents are removed from the melt in a separate evaporation zone of the screw extruder.

* * * * *